United States Patent [19]

Scheuneman et al.

[11] Patent Number: 4,989,210
[45] Date of Patent: Jan. 29, 1991

[54] PIPELINED ADDRESS CHECK BIT STACK CONTROLLER

[75] Inventors: James H. Scheuneman, St. Paul; Paul L. Peirson, Forest Lake; Michael E. Mayer, Fridley, all of Minn.

[73] Assignee: Unisys Corporation, Blue Bell, Pa.

[21] Appl. No.: 499,231

[22] Filed: Mar. 19, 1990

Related U.S. Application Data

[63] Continuation of Ser. No. 238,084, Aug. 30, 1988, abandoned.

[51] Int. Cl.⁵ .................................. G06F 11/10
[52] U.S. Cl. ........................ 371/40.1; 371/37.7; 371/40.3
[58] Field of Search ............. 371/40.1, 40.2, 40.3, 371/40.4, 51.1, 37.7

[56] References Cited

U.S. PATENT DOCUMENTS

| | | | |
|---|---|---|---|
| 4,706,249 | 11/1987 | Nakagawa | 371/40.1 |
| 4,710,934 | 12/1987 | Traynor | 371/40.1 |
| 4,800,535 | 1/1989 | McAlpine | 371/51.1 |
| 4,805,173 | 2/1989 | Hillis | 371/40.1 |
| 4,809,278 | 2/1989 | Kim | 371/51.1 |
| 4,809,279 | 2/1989 | Kim | 371/51.1 |
| 4,811,347 | 3/1989 | Bolt | 371/51.1 |
| 4,837,743 | 6/1989 | Chiu | 371/51.1 |

*Primary Examiner*—Charles E. Atkinson
*Attorney, Agent, or Firm*—Glenn W. Bowen; Mark T. Starr

[57] ABSTRACT

A memory system which is shared by a plurality of requestors each of which supply read and write address bits to the memory system is read out of, or written into, in accordance with read and write address bits. A sequencer is utilized to initiate a sequence of timing signals that control the reading, writing and partial writing of data. Certain ones of these signals occur at fixed intervals from the receipt of an initial load address signal. A read address circuit coupled to receive the read address bits generates a set of check bits. A read address stack means stores each set of read address check bits upon the occurrence of an associated load read address stack signal. A write address check bit generator means is coupled to receive write address bits and to generate a set of check bits representative of the write address bits. A write address stack means stores each set of the write address check bits upon the occurrence of an associated load write address stack signal. A read address stack selector and a write address stack selector read out read address check bits and write address check bits, while the sequencer controls the transmission of the read address check bits and the write address check bits to an error detection circuit.

1 Claim, 3 Drawing Sheets

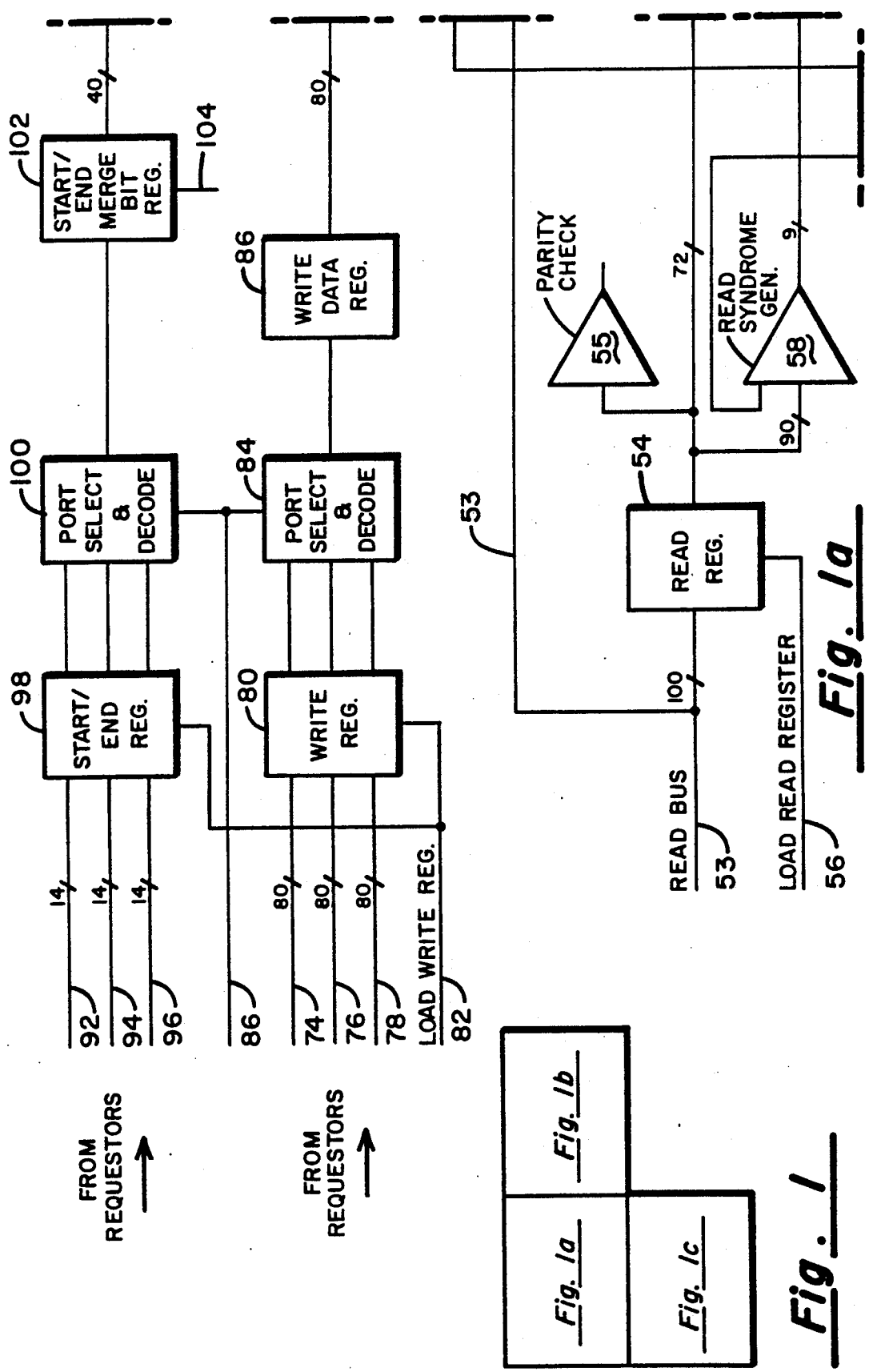

PIPELINED ADDRESS CHECK BIT STACK CONTROLLER

This application is a continuation of application Ser. No. 238,084, filed Aug. 30, 1988 and now abandoned.

BACKGROUND OF THE INVENTION

1. Field of the Invention

The present invention is related to the error checking and the detection of erroneous address bits in a data processing system, and, in particular, to error checking and detection of such address bit in a pipelined manner.

2. General Background

Error checking and detection of erroneous bits for both data words and addresses are currently implemented in modern data processing systems. Such systems may require multiple ports to allow remote processors to access a common storage module. The present invention provides for single and double bit data and address error checking and for single bit error correction of the data bits in a pipelined manner with a minimum of overhead in terms of hardware and complexity.

SUMMARY OF THE INVENTION

In this invention address bits received from multiple input ports on a pipelined basis are tested to locate bit errors during Write, Read and Partial Write operations. The system provides for such testing in a manner which is relatively easily implemented by using first-in, first-out (FIFO) Memory Stacks and Load Read and Write Address Pointers and Read, Write and Partial Write Pointers. These pointers are initiated by each Load Address signal received from a processor which starts a timing sequence that results in the generation of the Write, Read and Partial Write Pointers in a succession in a fixed timing cycle in which each successive pointer occurs a fixed time after the prior one, in the above-noted order. The Load Read Address Stack Pointer and the Load Write Address Stack Pointer may occur at the same time or at different times, but the Load Read Address Stack Pointer must precede the Read Pointer and the Load Write Address Stack Pointer must precede the Write Pointer.

BRIEF DESCRIPTION OF THE DRAWINGS

The present invention is illustrated by reference to the drawing in which:

FIG. 1 shows a layout for FIGS. 1a, 1b and 1c, and

FIGS. 1a, 1b and 1c are an overall block diagram of the pipelined address check bit control system of the present invention.

TECHNICAL DESCRIPTION OF THE INVENTION

Figure 1B:
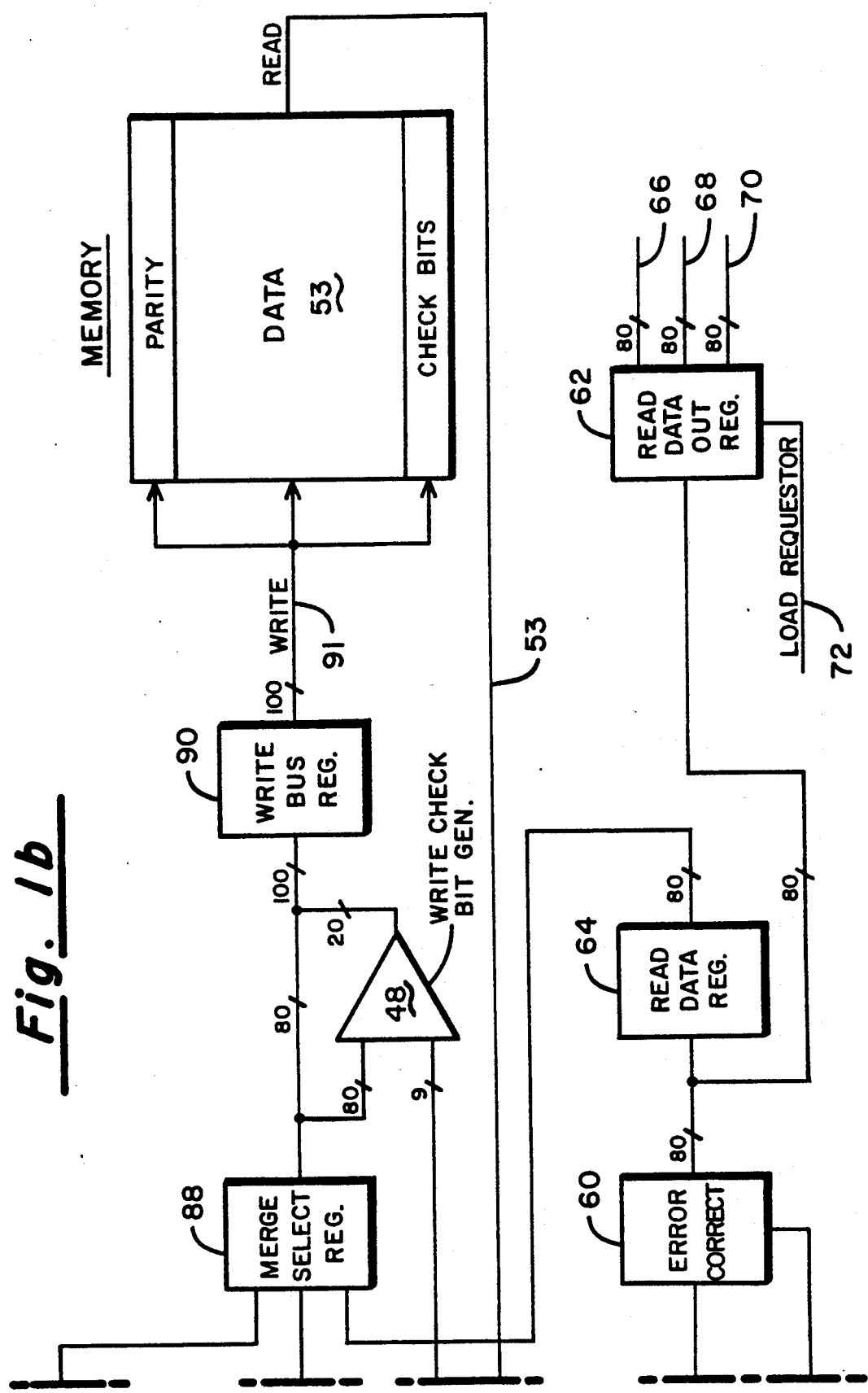
Figure 1C:
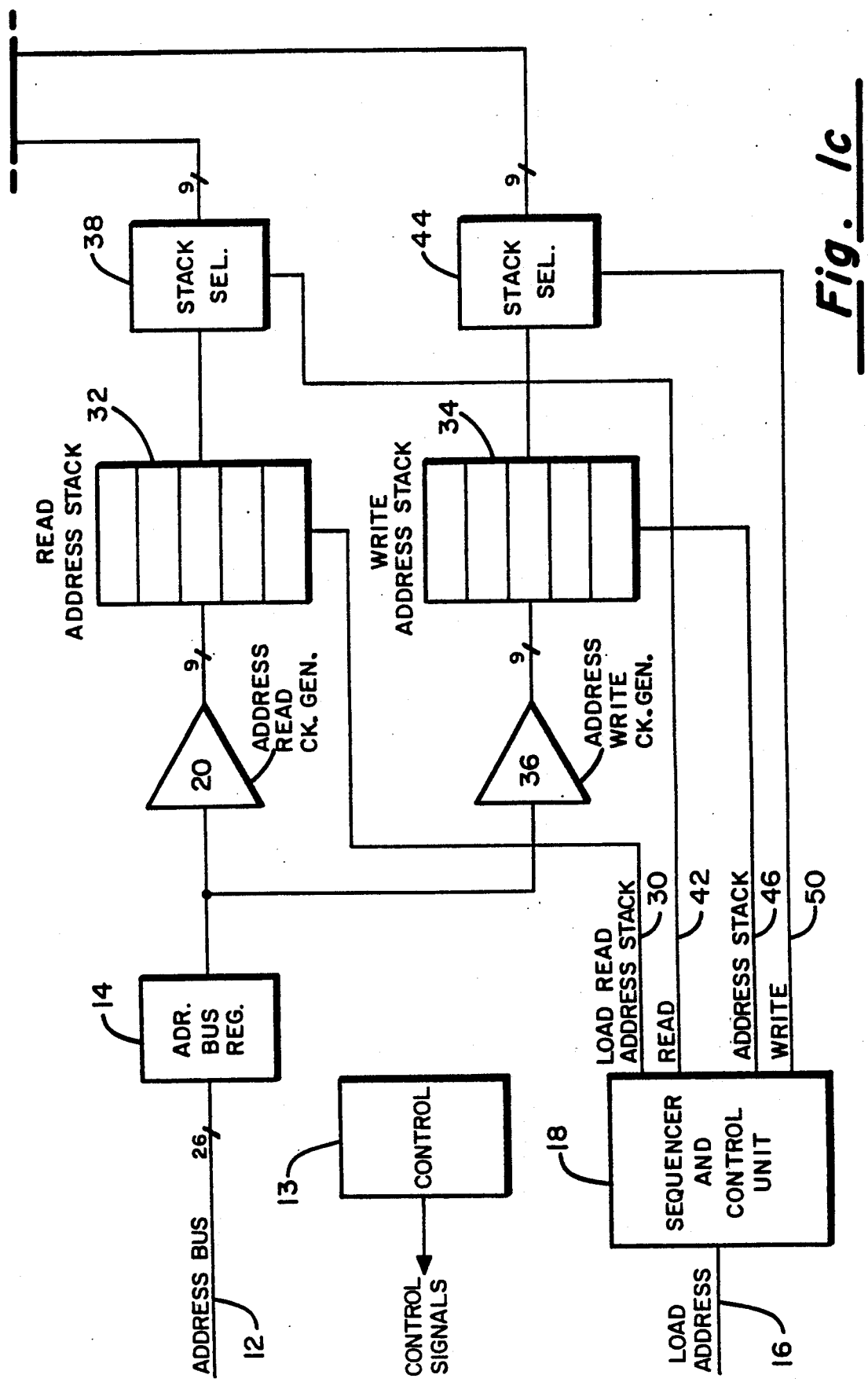

A pipelined address check-bit stack controller constructed in accordance with the present invention is shown in the drawings. This controller is particularly useful in a multiple-user environment in which different requestors issue priority requests and the requestors are assigned priority on some predetermined basis. When an address has been sent by a remote requestor or processor (not shown) on the 26 bit Address Bus 12 to the Address Register 14, along with a Load Address signal to the Sequencer and Control Unit 18 on the Load Address line 16, the address stored in the Address Bus Register 14 is coupled to a Address Read Check Generator 20. These 26 address bits may be used to specify memory units, banks, block addresses and words in an addressed block. The Address Read Check Generator 20 provides 8 check bits plus one parity bit in a conventional manner to verify the integrity of the address information.

The Load Address signal on the line 16 initiates the timing cycle for the address check bit stacks and the loading of addresses. For simplicity of implementation, it is preferred that the Load Write Address Stack Pointer signal occurs on the line 46 at the same time as the Load Read Address Stack Pointer signal on the line 30. The load address timing cycle begins upon a change of state of the Load Address signal from a high to a low level. When a second load address request is received by the Sequencer and Control Unit 18 and the Load Address signal again changes state from a high to a low, another new timing cycle is initiated. In a modern high speed data processing system these Load Address signals may occur as fast as every 30 nanoseconds.

The Load Read Address Stack and Write Address Stack Pointers are advanced each time the Load Address signal goes from a high to a low level. This advancement occurs at a fixed, continuously repeatable sequence after each transition of the Load Address signal from a high to a low level. The Load Read Address Stack Pointer signal is supplied on the line 30 to a Read Address Stack 32. This stack must be of sufficient depth to prevent overriding of stored information in the stack during normal operation, and generally will be of five levels or more. The Address Read Check Generator 20 produces 8 check bits and one parity bit that are stored in, and fill one level of the Read Address Stack 32.

Although a single stack could be employed for both read and write operations, it is expedient for ease of implementation to employ a separate Write Address Stack 34, which is supplied 8 address write check bits and one prity bit by the Address Write Check Generator 36. This minimizes the number of different types of circuit chips that are required and provides duplexing which can be used to isolate errors that affect only one of the stacks.

During the read cycle, the first group of check bits that have entered into the Read Address Stack 32 emerge first from the stack. These check bits are supplied to the Read Stack Selector 38 which supplies 8 address check bits and an associated parity bit to a Read Syndrome Generator 58 under the control of the Read Pointer that is supplied by the Sequencer and Control Unit 18 on the line 42. In a similar manner, the Write Stack Selector 44 receives 8 write check bits plus 1 parity bit from the Write Address Stack 34 under the control of the Write Pointer signal on the line 50. The Write Stack Selector 44 is gated to one input of the Write Check Bit Generator 48 in response to the Write Pointer on the line 50 from the Sequencer and Control Unit 18. The check bits plus the associated parity bits from the Write Stack Selector 44 that were received on its other input are used for write and partial write checking. The Write Check Bit Generator 48 generates 10 bits for each word of data, which consist of 8 check bits, a total data word parity bit and a parity bit for a byte formed of the 8 check bits and the total data word parity bit.

The read operation and the use of the stored Read Address Check Bits stored in the Read Address Stack 32 will now be discussed. The Read Bus 53 is 100 bits wide in the disclosed embodiment, and it is coupled to the Memory which has data, parity and check bits stored therein. The 100 bits from a combined memory word that consists of two data words of 36 bits (4 nine bit bytes) each, plus 1 total data word parity bit for each word, 8 check bits for each word, 4 data byte parity bits and one parity bit for a byte that consists of the 8 check bits and the total data word parity bit for each word.

These 100 bits are coupled into the Read Register 54 under control of a Load Read Register signal from the Controller 13 that is supplied on the line 56. The parity bits are checked at the interface by the Parity Check Circuit 55. Two words at a time, each consisting of 36 data bits plus 8 check bits and a total data parity bit are read out of the Read Register 54 to the Read Syndrome Generator 58, which also receives 9 bits at a time from the Read Stack Selector 44 and generates 9 Read Syndrome bits. The output of the Read Syndrome Generator 58 is supplied to an error correction circuit 60, which may be of a type known in the art, to correct errors in data words before they are sent to the Read Data Out Register 62 and the Read Data Register 64. Due to complexity of implementation, single and double bit error detection and single bit error correction of the data word should suffice for most applications. Two 36-bit words of data plus the data byte parity bits are stored in the Data Read Out Register 62, and are read out on a selected line 66, 68, or 70 under the control of signals on the Load Requestor line 72. The Read Data Register 64 is utilized when a Partial Write is performed, as will be described subsequently.

The Write operation precedes the Read operation, and, therefore, a Write Pointer signal on the line 50 occurs at an earlier time than the Read Pointer signal on the line 42. Both the Write and Read Pointers occur at fixed intervals following the transition of the Load Address signal on the line 16 from a high to a low level after the start of each timing cycle of the Sequencer 18. During a Write cycle, the write data from the remote processor in control is transmitted in groups of two words of 72 data bits plus 8 data byte parity bits on the associated Write Buses 74, 76 or 78 to the Write Register 80 under control of the Load Write Register Line 82. The particular port write data that is to be written at any time is determined by the Port Select Decoder 84 as determined by code on the port selection Bus 86. The write data is then supplied to the Write Data Register 86. During a full word write, the Merge Select Register 88 receives two 36 data bit words plus 4 data byte parity bits. As previously noted, the Write Check Bit Generator 48 generates 20 check bits which are combined with data bits and stored in the Write Bus Register 90, and then these bits are transferred as 50 bit words for storage in the Memory 53.

Address check bits generated during Partial Write operations may also be verified with the pipelined address check bits stack controller of the present invention. A Partial Write operation results when a word which has been read from memory has been corrected, and then a predetermined number of bits are written over the corrected word. The portion of the word that is written over may be divided into partial word bits from 1 to 35 bits. Partial address write check bits are verified at the time subsequent to the time allotted for the verification of the read address bits.

When a Partial Write operation occurs, the word read from Memory 53 from the previous cycle is stored in the Read Data Register 64. The Start and End Code bits for controlling the Partial Write masking operation are supplied by each of the requestors on the Partial Write Buses 92, 94, and 96 to the Start/End Register 98. There are 6 start bits plus a parity bit and 6 end bits plus another parity bit per merged word. The Port Selector and Decoder 100 is responsive to the select signal on the Bus 86 to select one set of 14 start/end and parity bits from one of the remote requestors. The selected Start and End Code bits from the requestor are then decoded and stored in the Start/End Merge Bit Register 102. A control signal from the Controller 13 on the line 104 to the Start/End Merge Bit Register activates a Partial Write operation.

During a Partial Write operation, the Start/End Merge Bit Register 102 contains the code which specifies the Starting and Ending bits which specify where the write data will overwrite a previously read data word. The write data is obtained from the remote requestors on the Buses 74, 76 and 78 via the Write Register 80, and the Port Selector and Decoder 84 and the Write Data Register 86, as previously described in connection with the full write operation. The read data in the Read Data Register 64 and the write data in the Write Data Register 86 are then merged and stored in the Merge Select Register 88 in accordance with the decoded Start and End codes stored in the Start/End Merge Bit Register 102. Partial Write address check bits are gated out of the Write Stack Selector 44 by a Partial Write Pointer signal that is applied on the line 50 that occurs at a point in time after the Read Pointer signal has been supplied on line 42. The Write Address Stack 34 is thus able to accommodate the address check bits for both full Write and the Partial Write operations.

We claim:

1. An address bit controller for an addressable memory system which is shared by a plurality of requesting processors, each of which processors is capable of supplying sets of signals which represent either read, or write or partial write address to enable writing information into, or reading information from, said memory system during read, write and partial write operations, comprising:

addressing means for receiving sets of address signals from said processors and for storing binary bit representations of said sets of address signals, address read check generator means coupled to said addressing means for generating read address check bits when a set of address signals received by said addressing means represents a read address, address write check bit generator means coupled to said addressing means for generating write address check bits when a set of address signals received by said addressing means represents a write address, controllable stack means for loading and storing said read address check bits and said write address check bits under the control of load address signals, said stack means being constructed to selectively read out said write address check bits during a write operation under the control of write pointer signals, to selectively read out from said stack means said read address check bits during read and partial write operations under the control of read pointer signals and to selectively read out from said stack means said write address check bits during partial write operations under the control of partial write pointer signals, sequencer means coupled to said stack means for supplying sequences of signals in which each sequence comprises load address, write pointer, read pointer and partial write pointer signals each time an address signal is received by said addressing means from one of said processors, wherein said write pointer signal precedes said read pointer signal by a fixed time, said read pointer signal precedes said partial write pointer signal by a fixed time, and said load address signals precede said pointer signals by a fixed amount in each of said sequences, addressable memory means having provisions for storing data bits and write address check bits at addresses selected by the address signals received from said processors during said write operations, and for reading data bits and said stored check bits from addresses selected by the address signals received from said processors write during read and partial write operations, read means coupled to said processors and to addressable memory means for receiving read data addresses from said processors and for reading data and associated check bits from addresses of said memory means selected by said processors, write means coupled to said processors and to said addressable memory means for receiving write data from said processors for writing either full data words or partial data words into said addressable memory means during write and partial write operations, respectively, at addresses selected by said processors, comprising merge means coupled to said read means for receiving read data therefrom for selectively either writing write data into said memory means during a write operation or for merging write data with read data and writing merged data into said memory means during a partial write operation, and further coupled to receive said write address check bits from said stack means for storing write check bits into said memory means at addresses which correspond to associated data words that are written into said memory means, write check generator means coupled to said stack means for receiving write address check bits from said stack means and to said write means for receiving write data to be written into said memory means that is associated with said write address check bits, which is constructed to generate said write check bits and to supply said write check means to said write means, read syndrome generator means coupled to said read means for receiving said stored check bits read from said memory means and to said stack means for receiving said read address check bits associated with the addresses of data read from said memory means, error correction means coupled to said read syndrome generator means for receiving the output of said syndrome generator means constructed to detect at least some data and stored check bit errors and to correct at least some of said data bit errors, said error correction means being further coupled to said write means for coupling the output of said error correction means to said merge means during said partial write operation, and data output means coupled to said error correction means for receiving the output of said error correction means during read operations and for supplying said output from said error correction means to said processors during a read operation.

* * * * *

UNITED STATES PATENT AND TRADEMARK OFFICE
CERTIFICATE OF CORRECTION

PATENT NO. : 4,989,210

DATED : 1/29/91

INVENTOR(S) : James H. Scheuneman, Paul L. Peirson, Michael E. Mayer

It is certified that error appears in the above-identified patent and that said Letters Patent is hereby corrected as shown below:

Column 5, line 17, change "write during" to -- during write, -- .

Signed and Sealed this

Twenty-third Day of June, 1992

Attest:

DOUGLAS B. COMER

*Attesting Officer*    *Acting Commissioner of Patents and Trademarks*